US008491762B2

(12) United States Patent
Kuhnel

(10) Patent No.: US 8,491,762 B2
(45) Date of Patent: Jul. 23, 2013

(54) WATER PURIFICATION APPARATUS AND PROCESS FOR PURIFYING WATER

(75) Inventor: Donald S. Kuhnel, Karnes County, TX (US)

(73) Assignee: Pioneer H2O Technologies, Inc., Denver, CO (US)

( * ) Notice: Subject to any disclaimer, the term of this patent is extended or adjusted under 35 U.S.C. 154(b) by 179 days.

(21) Appl. No.: 12/946,412

(22) Filed: Nov. 15, 2010

(65) Prior Publication Data

US 2012/0111720 A1    May 10, 2012

Related U.S. Application Data

(60) Provisional application No. 61/412,363, filed on Nov. 10, 2010.

(51) Int. Cl.
   C02F 1/467      (2006.01)
   C25B 11/02     (2006.01)
   C25B 9/06       (2006.01)

(52) U.S. Cl.
   USPC .................... 204/272; 210/748.17; 210/748.2

(58) Field of Classification Search
   None
   See application file for complete search history.

(56) References Cited

U.S. PATENT DOCUMENTS

| | | | |
|---|---|---|---|
| 3,893,900 A | 7/1975 | Teshima et al. | |
| 4,072,596 A | 2/1978 | Maeglich | |
| 4,085,028 A * | 4/1978 | McCallum | 204/269 |
| 4,144,148 A | 3/1979 | Kammel et al. | |
| 4,457,221 A * | 7/1984 | Geren | 99/451 |
| 4,719,018 A * | 1/1988 | Przybylski | 210/748.19 |
| 5,603,843 A * | 2/1997 | Snee | 210/748.18 |
| 6,126,820 A * | 10/2000 | DeSanto | 210/143 |
| 6,338,789 B1 | 1/2002 | Hecking | |
| 6,849,178 B2 | 2/2005 | Hecking | |
| 7,351,331 B2 | 4/2008 | Birkbeck | |
| 7,452,456 B2 | 11/2008 | Birkbeck | |
| 2002/0070107 A1* | 6/2002 | Usinowicz et al. | 204/228.3 |
| 2008/0083617 A1* | 4/2008 | Simpson et al. | 204/403.1 |
| 2009/0229981 A1* | 9/2009 | DeSanto | 204/554 |
| 2009/0242424 A1* | 10/2009 | Behr | 205/757 |

* cited by examiner

Primary Examiner — Harry D Wilkins, III
(74) Attorney, Agent, or Firm — Berenato & White, LLC

(57) ABSTRACT

A water purification apparatus is provided. The apparatus includes a casing and an electrode array. The casing has an outer surface, a substantially annular inner surface, and a water flow passage chamber surrounded by the substantially annular inner surface, the water flow passage chamber providing an outer annulus region and an inner central region. The electrode array features at least four electrodes in adjacent relationship to one another and circumferentially spaced apart from another about the outer annulus region, each electrode having a respective first planar surface and a respective second planar surface facing and substantially parallel to the respective second planar surface and the respective first planar surface of the adjacent electrodes on opposite sides thereof.

24 Claims, 10 Drawing Sheets

WATER PURIFICATION APPARATUS AND PROCESS FOR PURIFYING WATER

CROSS-REFERENCE TO RELATED APPLICATION(S)

This application claims the benefit of priority of provisional application 61/412,363 filed in the U.S. Patent & Trademark Office on Nov. 10, 2010, the complete disclosure of which is incorporated herein by reference.

FIELD OF THE INVENTION

The present invention relates to purification or disinfection of water and, more particularly, to the electrolytic purification or disinfection of water.

BACKGROUND OF THE INVENTION

A conventional electrode arrangement found in water purification apparatus is shown in FIG. 9, in which a positive electrode 91 and a negative electrode 93 are cylindrical with circular cross sections extending continuously along their lengths. The highest current density 92 between the electrodes is found in a common plane that intersects the diameters of both of the electrodes 91, 93. The respective outer surfaces of the electrodes 91, 93 are closest to one another in the common plane, that is, along narrow, substantially linear peripheral surface areas of the cylindrical electrodes intersected by the common plane.

Because the current density is greatest over such a narrow and relatively small surface area of the cylindrical electrodes 91, 93, cylindrical electrodes are not efficient in electrolyzing salts such as bromides. Additionally, certain cylindrical electrodes such as graphite can experience erosion along these narrow surface areas, releasing graphite particles into the electrolyte where the particles may accumulate. Further, the erosion causes the distance between the "closest" peripheral surface areas of the electrodes to increase. As the distance between electrodes increases, greater voltage is required to maintain current flux.

FIG. 10 is another example of a conventional electrode arrangement in which a positive electrode 101 and a negative electrode 103 each have a square cross section extending continuously along their lengths. The parallel plane surfaces of the electrodes 101, 103 facing one another provide a greater total surface area for quasi equal paths of greatest current flow 102 than the narrow, substantially linear areas of the cylindrical electrodes 91, 93 of FIG. 9. However, a problem with this conventional arrangement shown in FIG. 10 is that the opposite side surfaces of the electrodes make relatively insignificant contributions to overall current flow because they are coplanar with one another and farther from one another than the facing surfaces of the electrodes 101, 103. Also, sufficient uniform electrolyte fluid flow and fluid flow distribution across the electrode surface, in the parallel plane geometry of FIG. 10, is difficult to achieve. To the extent that direct flow of sufficient velocity may be achieved between the electrodes 101, 103, another problem arises in that the fluid flow can lead to premature failure of the graphite lattice. Still another problem is that dislodge graphite particles may become an aesthetic issue if the electrolyte is transparent.

Another drawback of conventional electrode geometry arrangements is compliance with industry standards. For example, UL Standard 1081 requires that the inlet to outlet voltage differential of the electrode assembly be essentially zero volts. UL Standard 1081 28.4 provides that there shall be no voltage drop in the water in the cell of an electrolytic chlorinator as measured between the water inlet and outlet, nor shall there be a flow of current, either alternating or direct, in excess of 1 milliampere from the water to ground. When using conventional parallel plane geometry, the zero volt differential between inlet and outlet is difficult to achieve because the geometrical orientation of the graphite electrodes in relation to the fluid flow inlet and the outlet will vary the differential voltage between the inlet and outlet.

SUMMARY OF THE INVENTION

A first aspect of the invention provides a water purification apparatus including a casing and an electrode array. The casing has an outer surface, an inner surface with a substantially annular cross section, and a water flow passage chamber surrounded by the inner surface, the water flow passage chamber providing an annulus region and a central region. The electrode array includes at least four electrodes in adjacent relationship to one another and circumferentially spaced apart from another about the annulus region. Each electrode has a respective first facet and a respective second facet facing and substantially parallel to the respective second facet and the respective first facet of the adjacent electrodes on opposite sides thereof.

A second aspect of the invention relates to a water purification apparatus including a casing and an electrode array. The casing has an outer surface, an inner surface with a substantially annular cross section, and a water flow passage chamber surrounded by the inner surface, the water flow passage chamber providing an annulus region and a central region. The electrode array includes at least four electrodes in adjacent relationship to one another and circumferentially spaced apart from one another about the annulus region. Each electrode has a respective first facet and a respective second facet facing and substantially parallel to the respective second facet and the respective first facet of the adjacent electrodes on opposite sides thereof. The electrodes of the electrode array include a first set of common polarity electrodes and a second set of common polarity electrodes, the electrodes of the first set in alternating arrangement with the electrodes of the second set. The electrode array is operable to simultaneously provide the first set of common polarity electrodes with a negative charge and the second set of common polarity electrodes with a positive charge.

Third and fourth aspects of the invention relate methods of purifying water utilizing the water purification apparatus of the first and second aspects of the invention, respectively.

Fifth and sixth aspects of the invention relates to a water purification system including the water purification apparatus of the first and second aspects of the invention, respectively.

Other aspects of the invention, including apparatus, systems, sub-assemblies (e.g., an electrolyzer unit), methods, and the like which constitute part of the invention, will become more apparent upon reading the following detailed description of the exemplary embodiments and viewing the drawings.

BRIEF DESCRIPTION OF THE DRAWING(S)

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS AND EXEMPLARY METHODS

Figure 1:
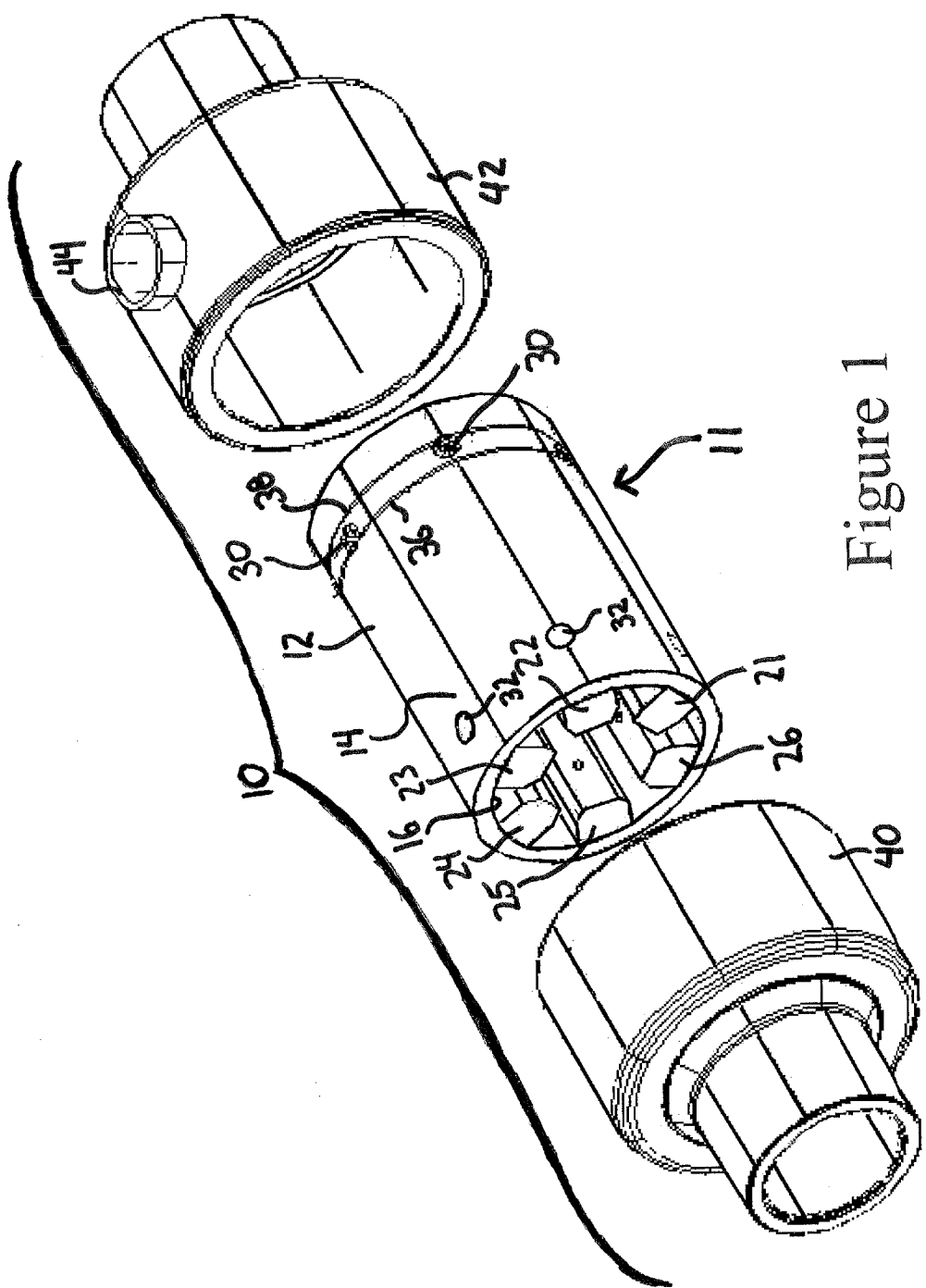
FIG. 1 is a perspective view of a water purification apparatus in a partially disassembled state according to an embodiment of the invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

FIGS. 1-4 illustrate an exemplary embodiment of an electrolyzer apparatus for water purification. The apparatus, generally designated by reference number 10, includes a central electrolyzer unit 11 featuring a substantially cylindrical casing 12 having an outer surface 14 and an inner surface 16. A water flow passage chamber 18 (FIG. 2) is surrounded by the inner surface 16. Any suitable material may be selected as the casing 12. It is preferred that the casing 12 material be electrically non-conductive. Plastics and ceramics, for example, PVC, may be selected as the casing 12.

An electrode array including six electrodes 21, 22, 23, 24, 25, and 26 is positioned inside the chamber 18 of the casing 12. Each electrode 21-26 is elongated so as to be substantially coextensive with the length of the cylindrical casing 12. The electrodes 21-26 are arranged in adjacent relationship to one another so that electrodes are positioned on opposite sides of each electrode, e.g., electrode 21 is adjacent to electrodes 22 and 26; electrode 22 is adjacent to electrodes 21 and 23; etc. The electrodes 21-26 are circumferentially spaced apart from another to establish an outer annulus region of the chamber 18. The circumferential spacing of the electrodes 21-26 as shown is substantially uniform. An inner central region of the chamber 18 within this annulus region is essentially empty of any structural component for allowing the flow of water through the casing 12. Water is also able to flow through the annulus region in the spacing between the electrodes 21-26.

In the illustrated embodiment the electrodes 21-26 are essentially identical. In the interest of brevity, only electrode 21 will be described in greater detail in connection with FIG. 3. Electrode 21 has a radially outer surface (facet) 21a facing the casing 12, a radially inner surface (facet) 21b facing the inner central region (and diametrically opposing another electrode 24 on the opposite side of the central region), and opposite side surfaces (facets) 21c and 21d in substantially parallel planes to one another arranged generally perpendicular to the radially inner and outer surfaces 21a, 21b. Oblique planar surfaces (facets) 21e and 21f are set at an oblique angle relative to surfaces 21b, 21c, and 21d. The electrode 21 as shown in FIG. 3 is six sided 21a-21f, i.e., hexagonal, in cross section. Although the electrodes 21-26 are substantially identical to one another in the embodiment of FIGS. 1-4, it should be understood that the electrodes 21-26 may possess different shapes and may be made of different materials from one another. Further, the electrodes 21-26 are not necessarily coextensive with the length of the casing 12.

Figure 2:
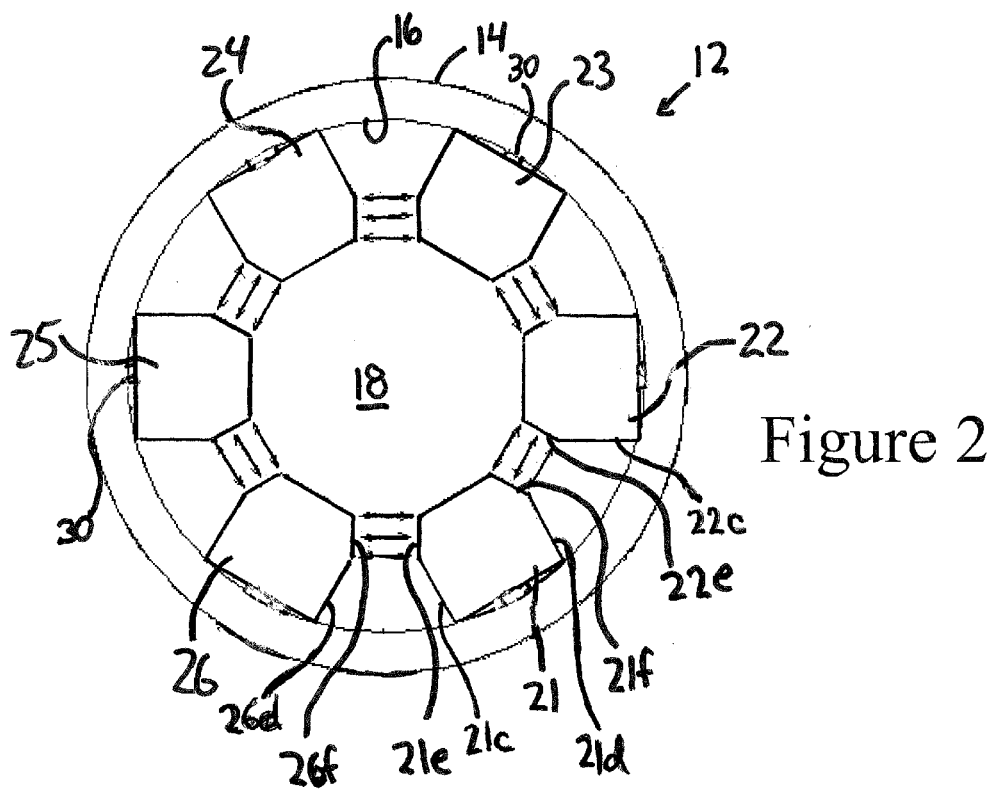
FIG. 2 is an end view of a central electrolyzer unit of the water purification apparatus of FIG. 1.
Figure 3:
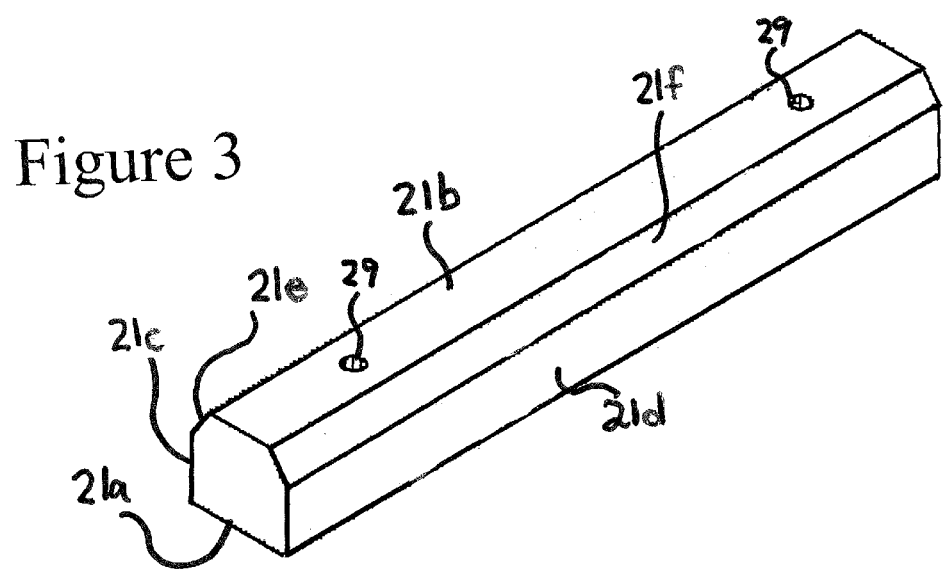
FIG. 3 is an enlarged, isolated view of an electrode of the water purification apparatus of FIG. 1.
Figure 4:
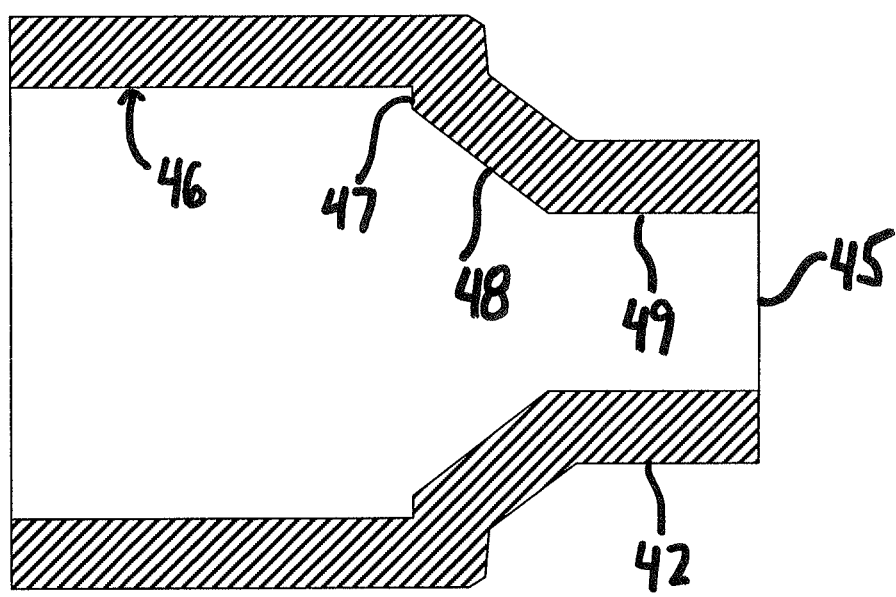
FIG. 4 is a cross-sectional view of an end cap of the water purification apparatus of FIG. 1.

As best shown in FIG. 2, the oblique planar surfaces 21e and 21f face and are substantially parallel to the oblique planar surface 26f of electrode 26 and the oblique planar surface 22e of the electrode 22, respectively. (Conversely, the side surfaces 21c and 21d are not substantially parallel to the side surface 26d of electrode 26 and the side surface 22c of the electrode 22, respectively.) The other electrodes 22-26 likewise have similar relationships with respect to their respective adjacent electrodes.

The electrodes may be made of any suitable material, many of which are known and conventional in the art. Metallic materials such as copper, silver, and alloys and combinations thereof may be selected, as may mixed metal oxides (MMO's) such as titanium plated with $RuO_2$. Graphite electrodes are particularly useful with bromine salt electrolytes. The graphite may include metals and/or mixed metal oxides. Graphite may be vacuum impregnated with copper to strengthen the graphite lattice and produce copper ions in the electrolyte. Copper ions aid in the reduction of algae in the electrolyte. Epoxy, silicone adhesives (e.g., Dow Corning 737), or other bonding substances may be vacuum impregnated in the graphite electrodes to help stabilize the graphite lattice. A semipermeable membrane may be used to cover the graphite, and thus lengthen the electrodes useful life. Exemplary electrode materials are disclosed in U.S. Pat. Nos. 7,452,456 and 7,351,331.

Referring back to FIG. 1, each electrode 21-26 is mounted to the casing 12 with a respective conductive fastener 30 received in a countersunk through hole of the casing 12. As discussed in greater detail below, the conductive fasteners 30 serve the additional function of electrically connecting the electrodes 21-26 with their respective voltage source. Additional countersunk through holes 32 are longitudinally spaced apart from the countersunk through holes in which the conductive fasteners 30 are received. The additional fasteners (not shown), which may be made of a conductive or non-conductive material, may be received in the countersunk through holes 32 to further secure the electrodes 21-26 to the casing 12. As best shown in FIG. 3, the electrodes, e.g., 21, have threaded holes 29 for receiving the fasteners. A bonding agent (e.g., Dow Corning 737) may be inserted in the holes 29 and/or applied to facet 21a to secure the electrodes 21-26 to the casing 12. The bonding agent may also serve to prevent oxidation of exposed surface areas of the fasteners. The fasteners may be, for example, screws, bolts, pins, rivets, etc.

The casing 12 of the electrolyzer 11 is provided with a first groove 36 and a second groove 38 encircling the outer surface 14 of the casing 12. A first conductive wire is primarily situated in the first groove, and a separate second conductive wire is primarily situated in the second groove. The first conductive wire is electrically connected to the conductive fasteners 30 positioned that mount electrodes 21, 23, and 25 to the casing 12. The second conductive wire is electrically connected to the conductive fasteners 30 positioned that mount electrodes 22, 24, and 26 to the casing 12. Thus, alternating electrodes 21, 23, 25 are commonly electrically connected to one another via the first conductive wire, and alternative electrodes 22, 24, and 26 are electrically connected to one another (but not to electrodes 21, 23, and 25) by the second conductive wire. A portion of the first and second wires may protrude from the grooves 36, 38 to facilitate their electrical connection to a controller and power source, such as with use of an adapter (discussed below). It should be understood that alternative wiring arrangements may be employed. For example, each electrode 21, 23, 25 of the first set of common polarity electrodes may be directly connected to an identical or different controller or voltage source so long as the electrodes 21, 23, 25 share the same (common) polarity (i.e., 21, 23, 25 are all positive or all negative). The same holds for electrodes 22, 24, 26 of the second set.

Returning to FIG. 1, the apparatus 10 further includes end caps 40 and 42 situated on the opposite ends of the electrolyzer unit 11. The end caps 40 and 42 may be pressure fitted to the casing 12, or may be secured using conventional fasteners and/or bonding. As best shown in the cross-sectional view of FIG. 4, the end cap 42 is defined by an inner cylindrical portion 46 that receives and is pressure fitted or otherwise connected to the casing 12. The end cap 42 further includes an inner shoulder 47 against which the end of the casing 12 may abut. An inner cylindrical portion 49 is connected to the shoulder 47 by a tapering portion 48. Finally, an outlet opening 45 is present at the distal end of the end cap 42. The inner cylindrical portion 49 and opening 45 may be sized to cooperate with (e.g., receive or be received by) inlet and outlet water flow conduits, such as flow pipe 116 discussed below in connection with FIG. 11.

End cap 42 has an attachment boss 44 for allowing access to the first and second wires of the electrolyzer 11. An adapter (not shown) is shaped so that it may be received by the attachment boss 44 for electrically connecting terminals of the adapter to the first and second wires, and hence to the electrodes. A crimp may be used to secure the electrical connection. Adhesive bonding and/or other fasteners also may be used.

End cap 40 has a substantially identical construction in the illustrated embodiment, except that end cap 40 does not include the attachment boss 44 (although it may).

Figure 11:
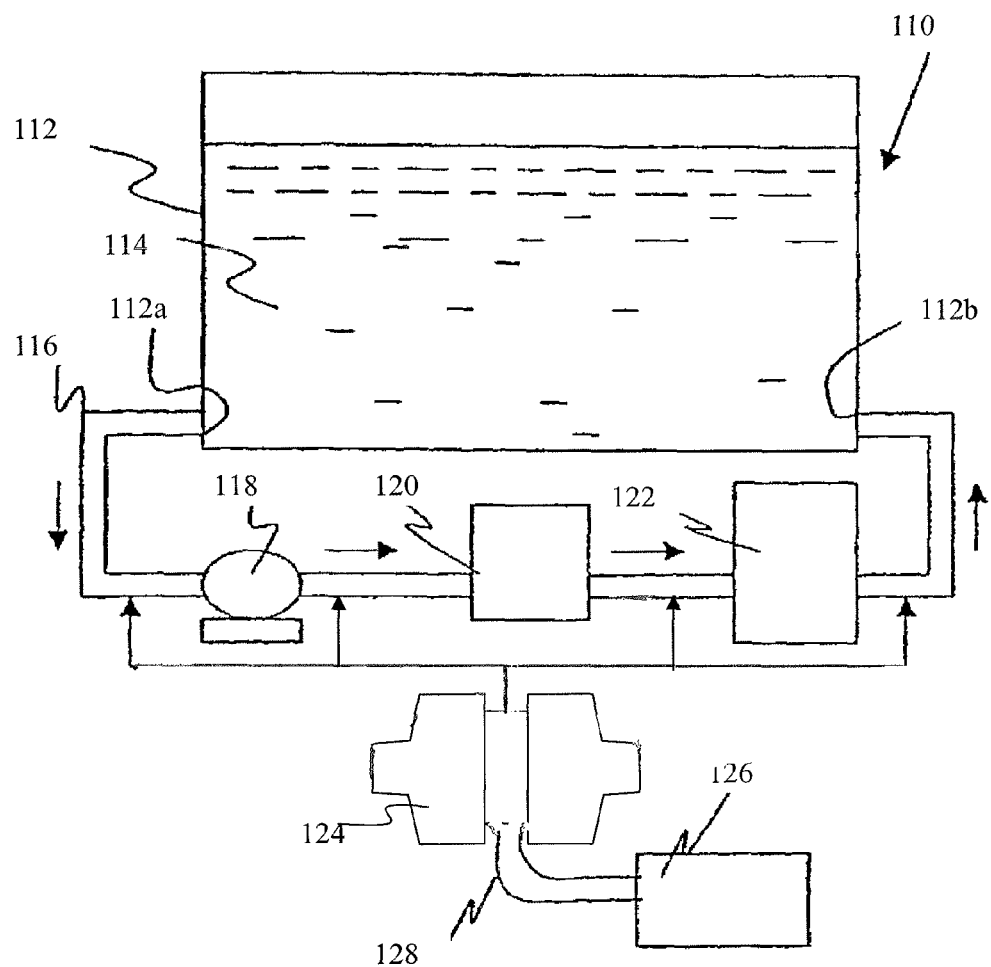
FIG. 11 is a schematic of a system incorporating a water purification apparatus according to an embodiment of the invention.

Referring now more particularly to FIG. 11, a water treatment system 110 according to an exemplary embodiment includes a reservoir 112, such as a spa or swimming pool, connected to a recirculation system. A recirculation flow pipe 116 communicates at its opposite ends with an outlet 112a and an inlet 112b of the reservoir 112. The system 110 further includes a pump 118 for displacing water 114 in the reservoir 112 through the recirculation flow pipe 116, and optionally includes a filter 120, such as a mechanical filter, situated along the recirculation flow pipe 116, for removing solid particles and debris from the system 110. In certain systems, such as for a hot tub, the recirculation system may further include a heater 122 for heating the water 114 to a selected temperature.

A water purification apparatus 124, e.g., such as apparatus 10 (or 50, 60, 70, or 80, discussed below) is also incorporated into the recirculation system. For example, the water purification apparatus 124 may be located near the outlet 112a before the pump 118, between the pump 118 and the filter 120, between the filter 120 and the heater 122, or near the inlet 112b. Electrical connectors 128, e.g., wires, electrically connect the water purification apparatus 124 to a controller 126 that supplies electrical current to the system. Any suitable power source can be used to power the controller 126. For example, the controller 126 may be supplied with power from a DC source or an AC source, and/or may include an appropriate AC/DC converter. Alternative power sources, such as combustible gas or natural power (e.g., wind, solar), may be used. The controller 126 may further provide on/off capability, and polarity reversal capability for reducing scale buildup at the electrode surfaces. A timer (not shown) may be used for automatically reversing polarity of the electrodes and/or automatically turning the system on and off. The controller 126 also may include sensors (not shown) for controlling operation of the system, for example, turning the system on and off based on a pH, water quality, or biological-based readings of the water 114.

Appropriate voltage and current levels and polarity reversal cycles depend on the intended use of the apparatus, and selection of suitable operation parameters and equipment is within the purview of those skilled in the art. In exemplary embodiments the voltage and current are designed to maintain the efficiency of electrolyzer unit 11 operation at some variable of distance between the conducting surfaces of the electrodes 21-26. A PWM (pulse with modulation) circuit may be used to control the rate of ion production while maintaining a suitable current and voltage for a given electrode element material geometry. For example, voltages of about 5 to about 7.5 and electrical currents between electrodes of about 50 milliamps to 2.00 amps have been found to be suitable for use of the apparatus 10 in connection with a recreational spa. Selection of polarity reversal time and technique for minimizing scale build up on the surfaces of the electrodes 21-26 is application dependent.

Figure 5:
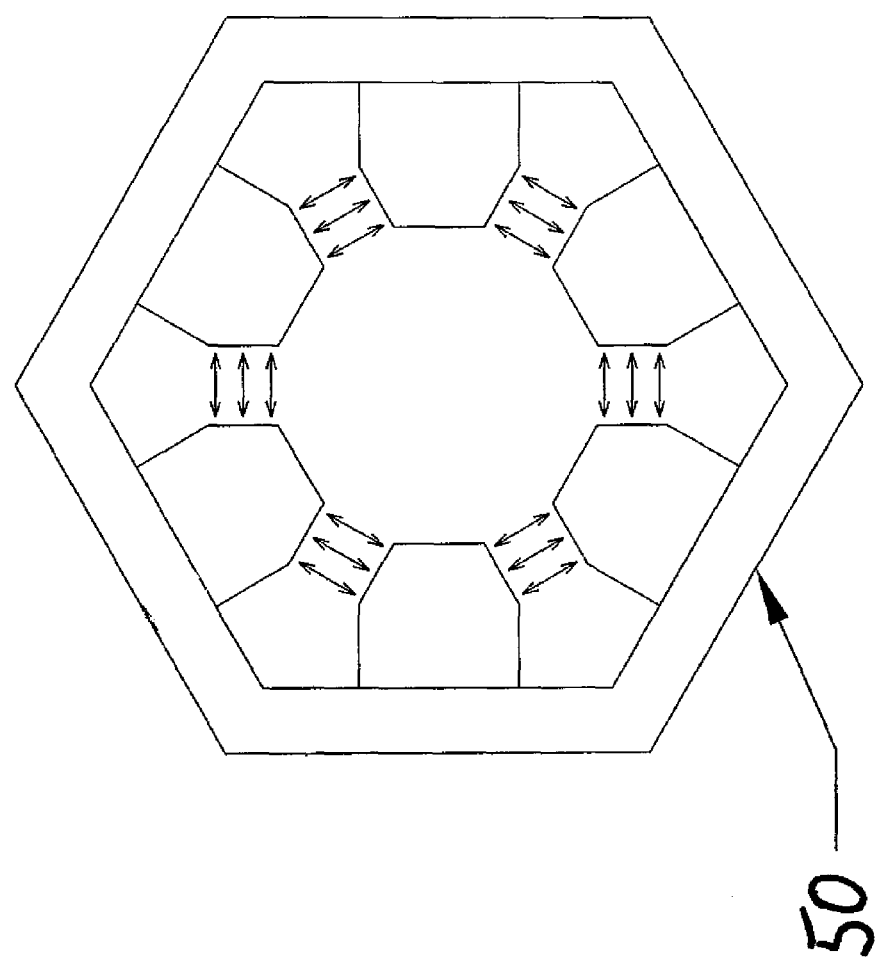
FIG. 5 is an end view of an electrolyzer unit of a water purification apparatus according to another embodiment of the invention.
Figure 6:
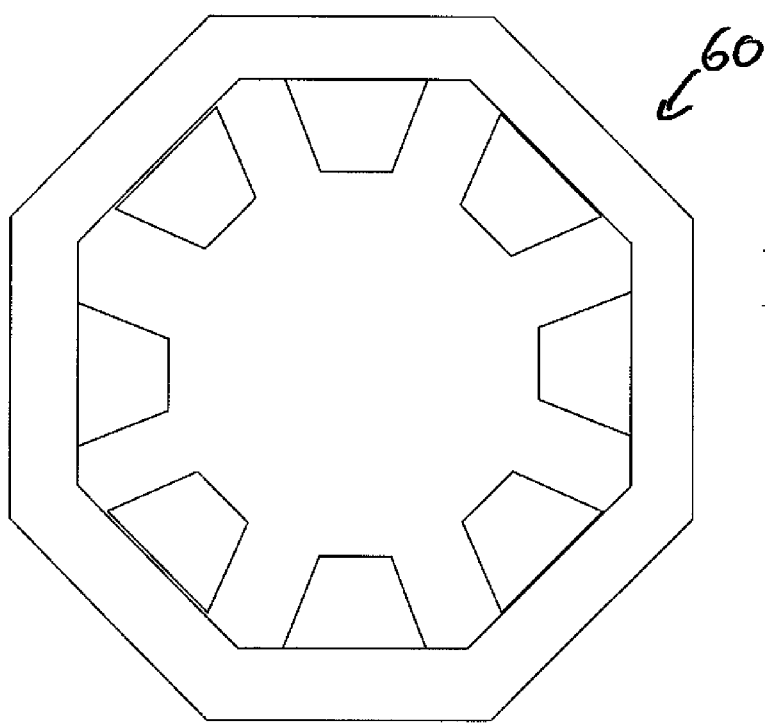
FIG. 6 is an end view of an electrolyzer unit of a water purification apparatus according to yet another embodiment of the invention.
Figure 7:
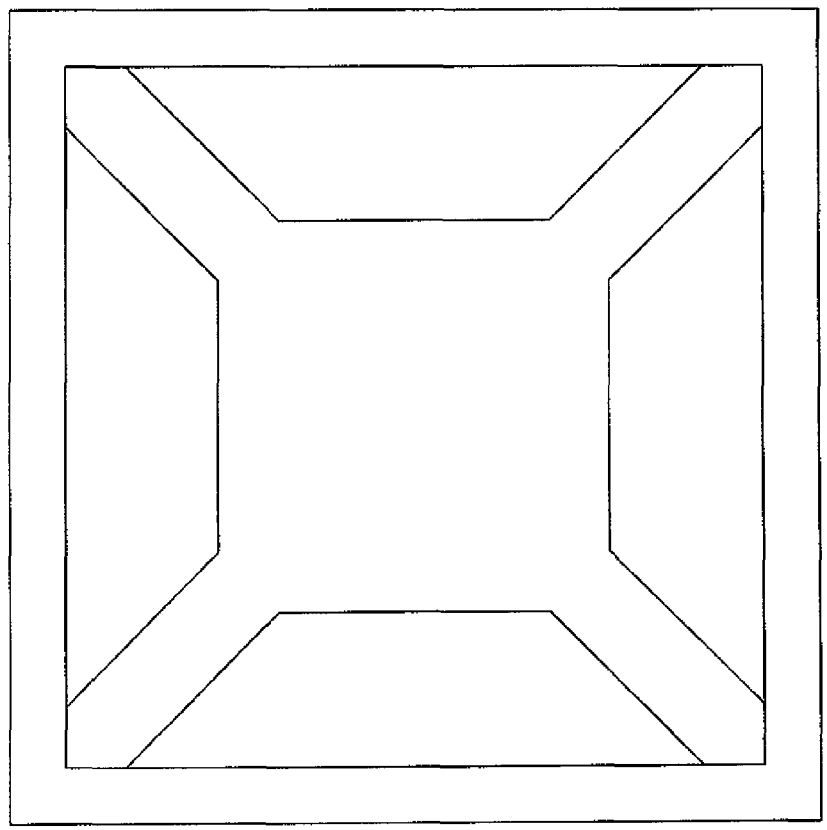
FIG. 7 is an end view of an electrolyzer unit of a water purification apparatus according to still another embodiment of the invention.
Figure 8:
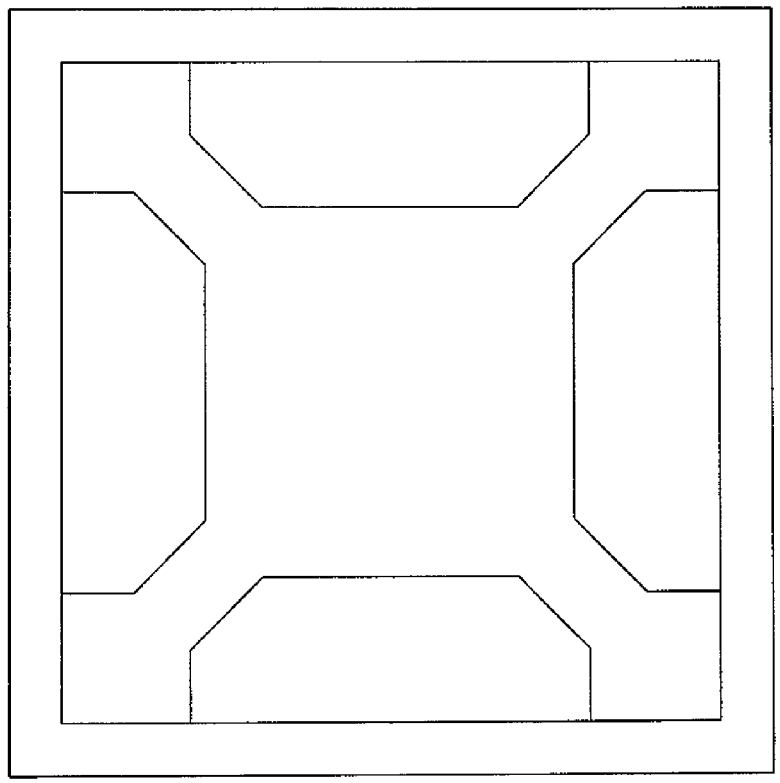
FIG. 8 is an end view of an electrolyzer unit of a water purification apparatus according to a further embodiment of the invention.
Figure 9:
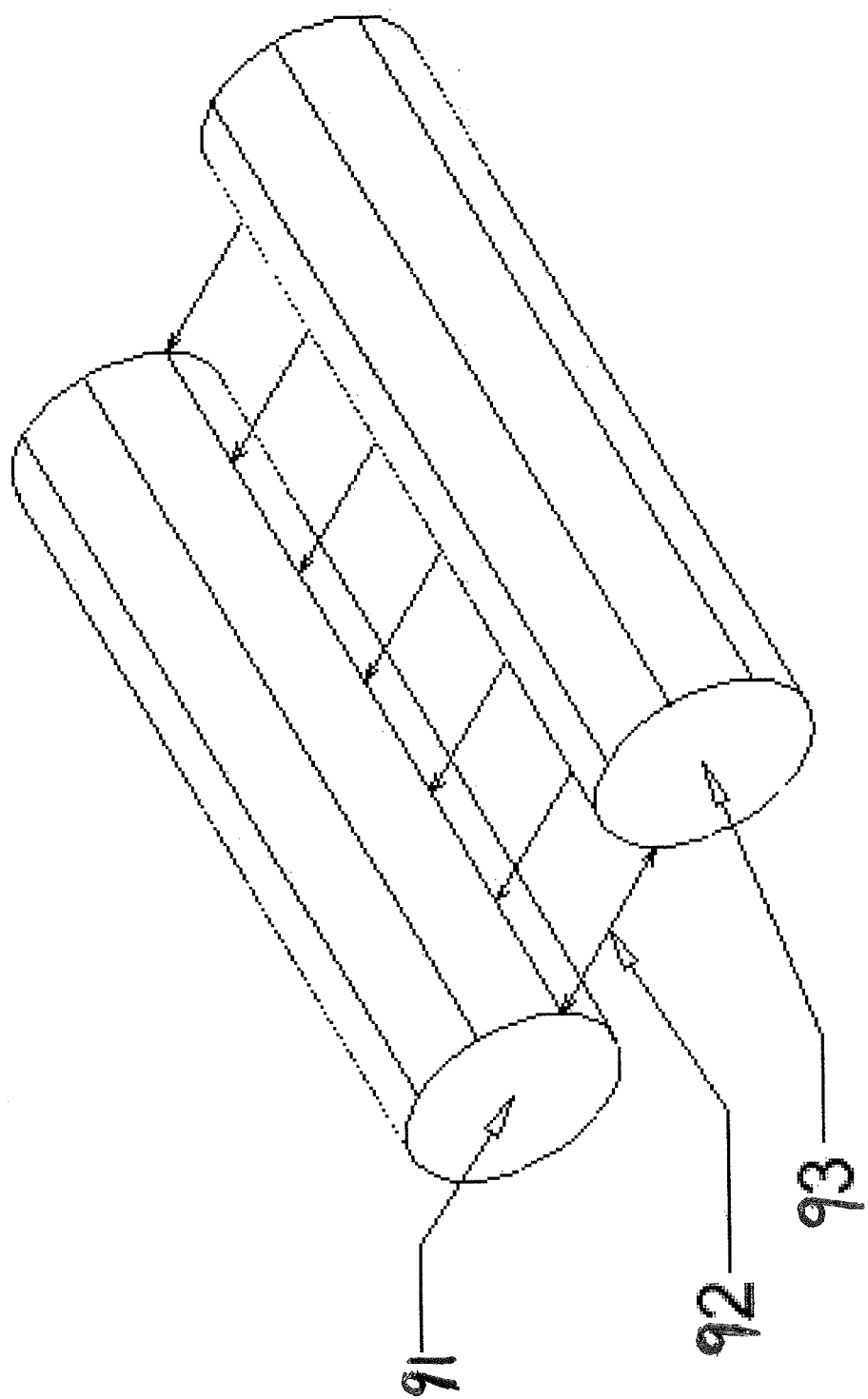
FIG. 9 is an example of a conventional electrode arrangement.
Figure 10:
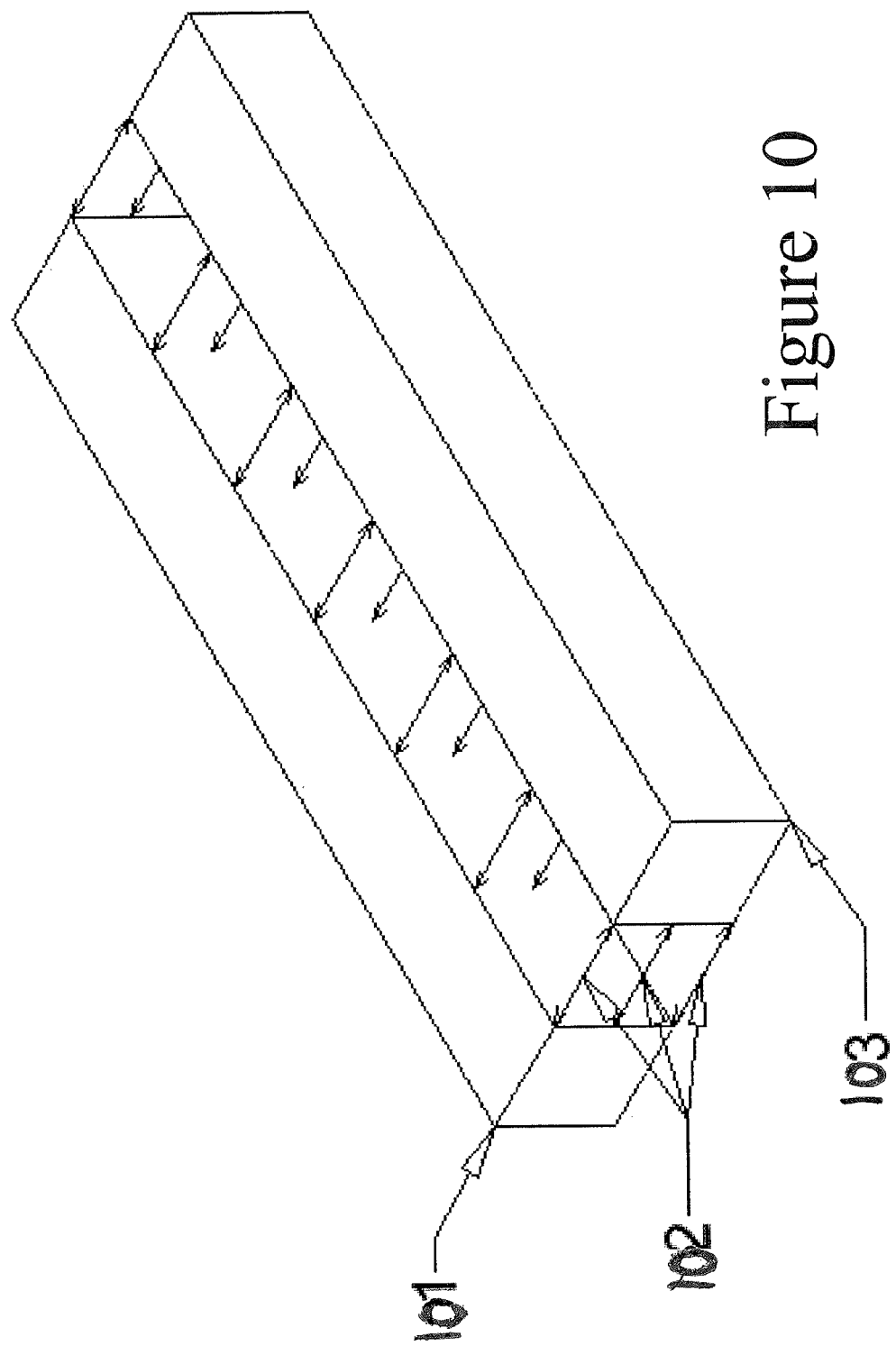
FIG. 10 is another example of a conventional electrode arrangement.

The length, width, depth, individual geometry, and number electrodes utilized in the assembly 10 are not limited to the six elements shown in the embodiment of FIGS. 1-4. Further, the casing 12 is not limited to a cylindrical shape. For example, FIG. 5 illustrates an alternative embodiment 50 in which the substantially annular casing is polygonal annular. FIG. 6 illustrates an alternative embodiment of an apparatus 60 possessing eight electrodes and a polygonal annular casing, wherein the electrodes have a trapezoidal cross section with greater interfacing surface areas between adjacent electrodes. FIGS. 7 and 8 illustrate still additional embodiments of apparatus 70 and apparatus 80 having four electrodes. Still other arrangements, shapes, and relationships may be practiced. The cross sections of the casing and the electrodes, while shown uniform, may vary over their length. The electrodes of an apparatus are not necessarily identical to one another.

Similarly, the purification system is not necessarily limited to the embodiment shown in FIG. 11. For example, instead of treating and recycling water in a reservoir 112, the system may be operated to purify drinking water, ground water, rainwater, or waste water.

Operation of the apparatus 10 in accordance with an exemplary embodiment will now be described.

It is desirable but not required that the apparatus 10 be oriented in a vertical position, perpendicular to the earth, with the inlet end cap 40 at the bottom and the outlet end cap 42 at the top. However, the apparatus 10 may be operated at various angles from perpendicular or in a horizontal orientation. Although the electrodes 21-26 are shown extending in length substantially parallel to water flow through the apparatus 10, it should be understood that the electrodes 21-26 may be obliquely or perpendicularly arranged relative to water flow.

The apparatus 10 may be used to purify water for recreational, residential, commercial and industrial uses. For example, recreational systems that the apparatus 10 may be used with include spas, hot tubs, swimming pools, saunas, etc. The apparatus also may be used in connection with the purification of drinking water, water storage tanks, well tanks, home water systems, etc. Depending on its desired application, the apparatus 10 may be operated as part of a chemical-based system, a copper ionization system, or a chemical-free system.

Discharge of electrical energy between the electrodes 21-26, more particularly between the substantially parallel planar surfaces of adjacent electrodes, during operation creates a reactive species in the water that can kill or render harmless pathogens, *E coli*, algae, viruses, and other microorganisms and contaminants. The reactive species may also prevent organic material from becoming a nutrient for algae and other microorganisms. For example, in chemical-free systems with the appropriate electrode material, the system may utilize a hydrolysis reaction to generate free radical forms of oxygen, such as hydroxyl radicals, atomic oxygen, hydrogen peroxide, and hydroxide ions. In chemical based systems, e.g., bromide and chloride salt solutions, the apparatus is operated to generate free bromine and chlorine. One particularly suitable electrolyte is an aqueous solution containing a bromide salt concentration of, for example, 50 to 4000 ppm.

The aforementioned improved design characteristics of the electrolyzer unit geometry may increase bromine production efficiency per unit area of the electrode surface. The higher bromine production efficiency improvement can be utilized to reduce the required surface area of the electrodes, reduce the volume of material (e.g., graphite) used in the individual electrodes, increase the MTBF (mean time between failures) through lower current density, and/or reduce the required bromide concentration. Reduction in electrode size allows for the production of more compact, smaller apparatus with lower material costs.

The electrolyte flow between the electrodes (in the annulus of the casing 12) is offset from the main electrolyte flow (in the central region of the casing 12); allowing for sufficient purging of the electrolyzed molecules from the surface of the electrodes, while reducing deterioration of the electrodes (e.g., the graphite lattice). In the horizontal orientation, gases produced by the electrolysis event have been observed flowing in the direction toward the inlet. In the illustrated embodiment, the orifice of the inlet end cap 40 is smaller in diameter than the inner diameter of the casing 12. The inlet orifice causes the hydrodynamics to produce a flow at the inner surface of the electrolyzer chamber opposite to the inlet flow, improving the circulation in the electrolyzer chamber. Thusly, a balance between the necessary circulation of the electrolyte on the surface of the electrodes is achieved, without unnecessary reduction of the electrodes useful life. The improved method of electrode flow control, by reducing the electrode (e.g., graphite lattice) deterioration, reduces the amount of unsightly particles contained in the electrolyte.

In operation, current flow between the electrodes 21-26 of the array in the above-discussed exemplary embodiment is evenly distributed. Evenly distributed current flow results in longer term stability of the distance between erodible electrode materials such as graphite. Thus, the electronic control of the current between the graphite electrodes is simpler to attain. The substantially annular array of electrodes provides a geometry that more efficiently utilizes the electrode element surface areas, facilitating a more efficient utilization of electrode material, particularly those made of graphite. Thus, commercialization potential is improved because a very small amount of graphite is lost in the fabrication process.

The electrolyzer apparatus 10 geometry also reduces and preferably eliminates the electrode fluid flow inlet to outlet differential voltage. The annular array geometry of the electrodes with alternating polarities successfully integrates the fluid flow inlet to outlet voltage differential. Also, the substantially annular array geometry is not sensitive to the geometrical relationship of the elements to the input and output of flow. Therefore, the orientation of the fluid flow input to output is an insignificant variable.

In accordance with an embodiment, graphite is typically produced in rectangular bars that are cut into shape as dictated by the desired design. The implementation of non-planar and non-perpendicular cuts to form, for example, the electrode shapes described above reduces production material losses. More exotic shapes for the graphite electrodes may be fabricated by using, for example, vapor deposition.

The foregoing detailed description of the certain exemplary embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Although only a few embodiments have been disclosed in detail above, other embodiments are possible and the inventors intend these to be encompassed within this specification and the scope of the appended claims. The specification describes specific examples to accomplish a more general goal that may be accomplished in another way. Modifications and equivalents will be apparent to practitioners skilled in this art and are encompassed within the spirit and scope of the appended claims and their appropriate equivalents. This disclosure is intended to be exemplary, and the claims are intended to cover any modification or alternative which might be predictable to a person having ordinary skill in the art.

Only those claims which use the words "means for" are to be interpreted under 35 U.S.C. §112, sixth paragraph. Moreover, no limitations from the specification are to be read into any claims, unless those limitations are expressly included in the claims.

What is claimed is:

1. A water purification apparatus, comprising:
    a casing having an outer surface, an inner surface with a substantially annular cross section, and a water flow passage chamber surrounded by the inner surface, the water flow passage chamber providing an annulus region and a central region; and
    an electrode array comprising at least four electrodes in adjacent relationship to one another and circumferentially spaced apart from another about the annulus region, each of the at least four electrodes having a respective first facet and a respective second facet facing and substantially parallel to the respective second facet and the respective first facet of the adjacent electrodes on opposite sides thereof,
    wherein each of the at least four electrodes of the electrode array comprises a radially outer surface facing the casing, a radially inner surface facing the central region, and oblique side surfaces establishing the first and second facets.

2. The water purification apparatus of claim 1, wherein the substantially annular cross section is circular annular.

3. The water purification apparatus of claim 1, wherein the substantially annular cross section is polygonal annular.

4. The water purification apparatus of claim 1, wherein each of the electrodes of the electrode array have substantially identical cross-sectional geometries and sizes relative to one another.

5. The water purification apparatus of claim 1, wherein the electrodes comprise graphite.

6. The water purification apparatus of claim 1, further comprising an inlet end fitting and an outlet end fitting having an inlet and an outlet, respectively, of reduced diameter that is smaller than a diameter defined by the inner surface.

7. The water purification apparatus of claim 6, wherein the inlet and outlet end fittings each have a tapering inner surface portion.

8. The water purification apparatus of claim 1, wherein the at least four electrodes of the electrode array are each hexagonal in cross section.

9. The water purification apparatus of claim 1, wherein the at least four electrodes of the electrode array are each trapezoidal in cross section.

10. A water purification apparatus, comprising:
a casing having an outer surface, an inner surface with a substantially annular cross section, and a water flow passage chamber surrounded by the inner surface, the water flow passage chamber providing an annulus region and a central region; and
an electrode array comprising at least six electrodes in adjacent relationship to one another and circumferentially spaced apart from another about the annulus region, each of the at least six electrodes having a respective first facet and a respective second facet facing and substantially parallel to the respective second facet and the respective first facet of the adjacent electrodes on opposite sides thereof.

11. A water purification apparatus, comprising:
a casing having an outer surface, an inner surface with a substantially annular cross section, and a water flow passage chamber surrounded by the inner surface, the water flow passage chamber providing an annulus region and a central region; and
an electrode array comprising at least four electrodes in adjacent relationship to one another and circumferentially spaced apart from another about the annulus region, each of the at least four electrodes having a respective first facet and a respective second facet facing and substantially parallel to the respective second facet and the respective first facet of the adjacent electrodes on opposite sides thereof, the at least four electrodes of the electrode array including a first set of common polarity electrodes and a second set of common polarity electrodes, the electrodes of the first set alternating with the electrodes of the second set, the electrode array being operable to simultaneously provide the first set of common polarity electrodes with a negative charge and the second set of common polarity electrodes with a positive charge,
wherein each of the at least four electrodes of the electrode array comprises a radially outer surface facing the casing, a radially inner surface facing the inner central region, and oblique side surfaces establishing the first and second facets.

12. The water purification apparatus of claim 11, wherein the substantially annular cross section is circular annular.

13. The water purification apparatus of claim 11, wherein the substantially annular cross section is polygonal annular.

14. The water purification apparatus of claim 11, wherein each of the electrodes of the electrode array have substantially identical cross-sectional geometries and sizes relative to one another.

15. The water purification apparatus of claim 11, wherein the electrodes comprise graphite.

16. The water purification apparatus of claim 11, wherein the polarities of the first and second sets of electrodes are reversibly operable to simultaneously provide the first set of common polarity electrodes with a positive charge and the second set of common polarity electrodes with a negative charge.

17. The water purification apparatus of claim 11, further comprising an inlet end fitting and an outlet end fitting having an inlet and an outlet, respectively, of reduced diameter that is smaller than a diameter defined by the inner surface.

18. The water purification apparatus of claim 17, wherein the inlet and outlet end fittings each have a tapering inner surface portion.

19. The water purification apparatus of claim 11, wherein the at least four electrodes of the electrode array are each hexagonal in cross section.

20. The water purification apparatus of claim 11, wherein the at least four electrodes of the electrode array are each trapezoidal in cross section.

21. A water purification apparatus, comprising:
a casing having an outer surface, an inner surface with a substantially annular cross section and a water flow passage chamber surrounded by the inner surface, the water flow passage chamber providing an annulus region and a central region; and
an electrode array comprising at least six electrodes in adjacent relationship to one another and circumferentially spaced apart from another about the annulus region, each of the at least six electrodes having a respective first facet and a respective second facet facing and substantially parallel to the respective second facet and the respective first facet of the adjacent electrodes on opposite sides thereof, the at least six electrodes of the electrode array including a first set of common polarity electrodes and a second set of common polarity electrodes, the electrodes of the first set alternating with the electrodes of the second set, the electrode array being operable to simultaneously provide the first set of common polarity electrodes with a negative charge and the second set of common polarity electrodes with a positive charge.

22. A system, comprising:
a water source; and
a water purification apparatus connected to the water source, the water purification apparatus comprising
a casing having an outer surface, an inner surface with a substantially annular cross section, and a water flow passage chamber surrounded by the inner surface, the water flow passage chamber providing an annulus region and a central region; and
an electrode array comprising at least four electrodes in adjacent relationship to one another and circumferentially spaced apart from another about the annulus region, each of the at least four electrodes having a respective first facet and a respective second facet facing and substantially parallel to the respective second facet and the respective first facet of the adjacent electrodes on opposite sides thereof, wherein the at least four electrodes of the electrode array each comprises a radially outer surface facing the casing, a radially inner surface facing the central region, and oblique side surfaces establishing the first and second facets.

23. The system of claim 22, wherein the at least four electrodes of the electrode array are each hexagonal in cross section.

24. The system of claim 22, wherein the at least four electrodes of the electrode array are each trapezoidal in cross section.

* * * * *